US010025360B2

(12) United States Patent
Nanda et al.

(10) Patent No.: US 10,025,360 B2
(45) Date of Patent: Jul. 17, 2018

(54) THERMAL ADJUSTMENT IN A COMPUTING DEVICE USING DISTRIBUTED SENSORS

(71) Applicant: Google Inc., Mountain View, CA (US)

(72) Inventors: Sameer Nanda, San Jose, CA (US); Vincent Palatin, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 424 days.

(21) Appl. No.: 13/737,129

(22) Filed: Jan. 9, 2013

(65) Prior Publication Data

US 2014/0195066 A1 Jul. 10, 2014

(51) Int. Cl.
*G06F 1/20* (2006.01)
*G06F 1/32* (2006.01)

(52) U.S. Cl.
CPC .............. *G06F 1/206* (2013.01); *G06F 1/203* (2013.01); *G06F 1/324* (2013.01); *G06F 1/325* (2013.01); *Y02D 10/126* (2018.01); *Y02D 10/16* (2018.01)

(58) Field of Classification Search
None
See application file for complete search history.

(56) References Cited

U.S. PATENT DOCUMENTS

| | | | |
|---|---|---|---|
| 5,652,893 A * | 7/1997 | Ben-Meir | G06F 1/3215 713/300 |
| 6,072,163 A * | 6/2000 | Armstrong | H01L 21/67103 118/724 |
| 6,337,630 B1 * | 1/2002 | Hass | G06F 1/20 340/606 |
| 6,348,277 B1 * | 2/2002 | Faris | H01M 6/5011 429/208 |
| 6,760,649 B2 * | 7/2004 | Cohen | G05D 23/1928 700/299 |
| 6,954,684 B2 * | 10/2005 | Frankel | G06Q 30/0233 705/14.1 |
| 7,113,917 B2 | 9/2006 | Jacobi et al. | |
| 7,827,208 B2 | 11/2010 | Bosworth et al. | |
| 8,095,432 B1 | 1/2012 | Berman et al. | |
| 8,103,611 B2 | 1/2012 | Tuzhilin et al. | |
| 8,843,239 B2 * | 9/2014 | Mighdoll et al. | 700/277 |

(Continued)

FOREIGN PATENT DOCUMENTS

WO    2005/017468 A2    2/2005

OTHER PUBLICATIONS

International Search Report and Written Opinion for International Application No. PCT/US2014/010527, dated Mar. 27, 2014, 13 pages.

(Continued)

*Primary Examiner* — Robert E Fennema
*Assistant Examiner* — Marzia T Monty
(74) *Attorney, Agent, or Firm* — Brake Hughes Bellermann LLP (57) ABSTRACT

A method and system detect temperatures of multiple zones of a computer system using sensors distributed across the computer system. For each of the sensors, the system may determine whether a detected temperature associated with the sensor exceeds a predetermined value. If the detected temperature exceeds the predetermined value, the system may cool at least one of a plurality of devices of the system, based on a proximity of the at least one of the plurality of devices to the sensor.

11 Claims, 5 Drawing Sheets

(56) References Cited

U.S. PATENT DOCUMENTS

| | | | | |
|---|---|---|---|---|
| 2002/0140389 | A1* | 10/2002 | Ohki | G06F 1/206 318/471 |
| 2004/0186629 | A1* | 9/2004 | Frankel | G05D 23/1902 700/300 |
| 2005/0184705 | A1* | 8/2005 | Gawell | H02J 7/0075 320/160 |
| 2011/0077797 | A1* | 3/2011 | Mehrotra | G05D 23/1917 700/300 |
| 2011/0226460 | A1* | 9/2011 | Sommer | G06F 1/206 165/200 |
| 2011/0301778 | A1* | 12/2011 | Liang | G05D 23/1932 700/299 |
| 2012/0003912 | A1* | 1/2012 | Hoover | H05K 7/20727 454/184 |
| 2012/0011367 | A1* | 1/2012 | Denison | G07F 11/002 713/170 |
| 2012/0140402 | A1* | 6/2012 | Mizumura | H05K 7/20836 361/679.33 |
| 2012/0191257 | A1* | 7/2012 | Corcoran | H04L 12/2818 700/278 |
| 2012/0239221 | A1* | 9/2012 | Mighdoll | F24F 11/0012 700/300 |
| 2013/0035992 | A1* | 2/2013 | Silverman | 700/300 |
| 2014/0114496 | A1* | 4/2014 | Berry | F04D 27/00 700/299 |

OTHER PUBLICATIONS

"Digital Temperature Sensor with SST Interface ADT7484A/AD7486A", retrieved on Mar. 13, 2014 from http://www.hqew.net/files/pdf/AD/ADT7484AARMZ-REEL7/ADT7484AARMZ-REEL7_www.hqew.com.pdf, Dec. 31, 2006, 16 pages.

International Preliminary Report on Patentability for PCT/US2014/010527, dated Jul. 23, 2015, 9 pages.

* cited by examiner

THERMAL ADJUSTMENT IN A COMPUTING DEVICE USING DISTRIBUTED SENSORS

FIELD

This description relates to thermal management, and more specifically to thermal adjustment of a computer system using distributed sensors.

BACKGROUND

A computer system, such as a laptop, may have a large number of devices that contribute to the heat of the system. For example, the central processing unit (CPU) may consume a large amount of power and therefore contribute to heating the system. Additionally, other devices such as a graphics processing unit (GPU), a display screen (especially for screens with large resolution, or high screen brightness), a charging battery, and external devices such as USBs, hard drives, 3G modem, or Wi-Fi devices may also consume power and thereby contribute to heating the system.

Two ways to cool a computer system include active cooling (e.g., using a fan), or passive cooling (e.g., by throttling back CPU speed, slowing down a battery charge speed, dimming a screen, etc.). Yet, a system may not be able to cool itself efficiently if it lacks a way to manage temperature across the entire system. Thus, a need exists for systems, methods, and apparatus to address the shortfalls of present technology and to provide other new and innovative features.

SUMMARY

In one general aspect, a method includes detecting temperatures of multiple zones of a computer system using sensors distributed across the computer system, and for each sensor of the sensors: determining whether a detected temperature associated with the sensor exceeds a predetermined value; and if the detected temperature exceeds the predetermined value, cooling at least one of a plurality of devices of the computer system, wherein the cooling is performed based on a proximity of the at least one of the plurality of devices to the sensor.

In various implementations, the cooling may be performed until the detected temperature no longer exceeds the predetermined value. The cooling may include activating a fan to cool one of the multiple zones where the sensor is located, slowing down a battery charging speed, dimming a backlight of a display of the computer system, changing a speed of a central processing unit of the computer system, changing a speed of a graphics processing unit of the computer system, or disabling a remote device connected to the computer system. Each of the sensors may account for a local temperature and a remote temperature.

In another general aspect, a method includes detecting temperatures of multiple zones of a computer system using sensors distributed across the computer system, determining whether any sensor temperature for any of the sensors exceeds a predetermined target temperature, and if any sensor temperature exceeds the predetermined target temperature, cooling the computer system in one of the multiple zones where the sensor temperature was detected.

In various implementations, if any sensor temperature exceeds the predetermined target temperature, the method may include cooling all of the multiple zones of the computer system. The cooling may be performed until the sensor temperature for the one of the multiple zones no longer exceeds the predetermined value.

In yet another general aspect, a computer system includes a plurality of devices including a central processing unit and a graphics processing unit, at least one cooling device, multiple sensors distributed across the computer system, each of the multiple sensors configured to detect a remote temperature and a local temperature for a zone of the computer system, a memory including executable code, and a processor operably coupled to the memory. The processor may be configured to execute the executable code to detect temperatures of multiple zones using the multiple sensors. For each sensor of the sensors, the processor may determine whether a detected temperature associated with the sensor exceeds a predetermined value. If the detected temperature exceeds the predetermined value, the processor may determine if any of the plurality of devices is within the zone associated with the sensor, and activate the at least one cooling device to cool at least one of the plurality of devices if the at least one of the plurality of devices is within the zone associated with the sensor.

One or more of the implementations of the subject matter described here may provide one or more of the following advantages. A computer system is more efficiently cooled when distributed sensors monitor thermal states across different zones of the computer system. A global response to power consumption is applied to regulate power consumption based on a single target temperature for the system. Other advantages of various implementations described here include providing an improved balance between system performance, heat, and noise. Still other advantages include providing a single thermal manager to efficiently control the overall temperature of a computer system.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Systems and methods described here provide multiple thermal sensors distributed in different locations across a computer system, such as a laptop, to help determine thermal states. A global response to power consumption is applied to regulate power consumption based on a single target temperature for the system.

In one implementation, the system may detect a maximum temperature of all sensors and base all cooling actions off of that one maximum temperature. Alternatively or additionally, the system may review each sensor's temperature individually, and determine a level of cooling of each device based on the proximity of sensors to the device. If the temperatures are low enough, none of the cooling devices may need to be engaged.

Figure 1:
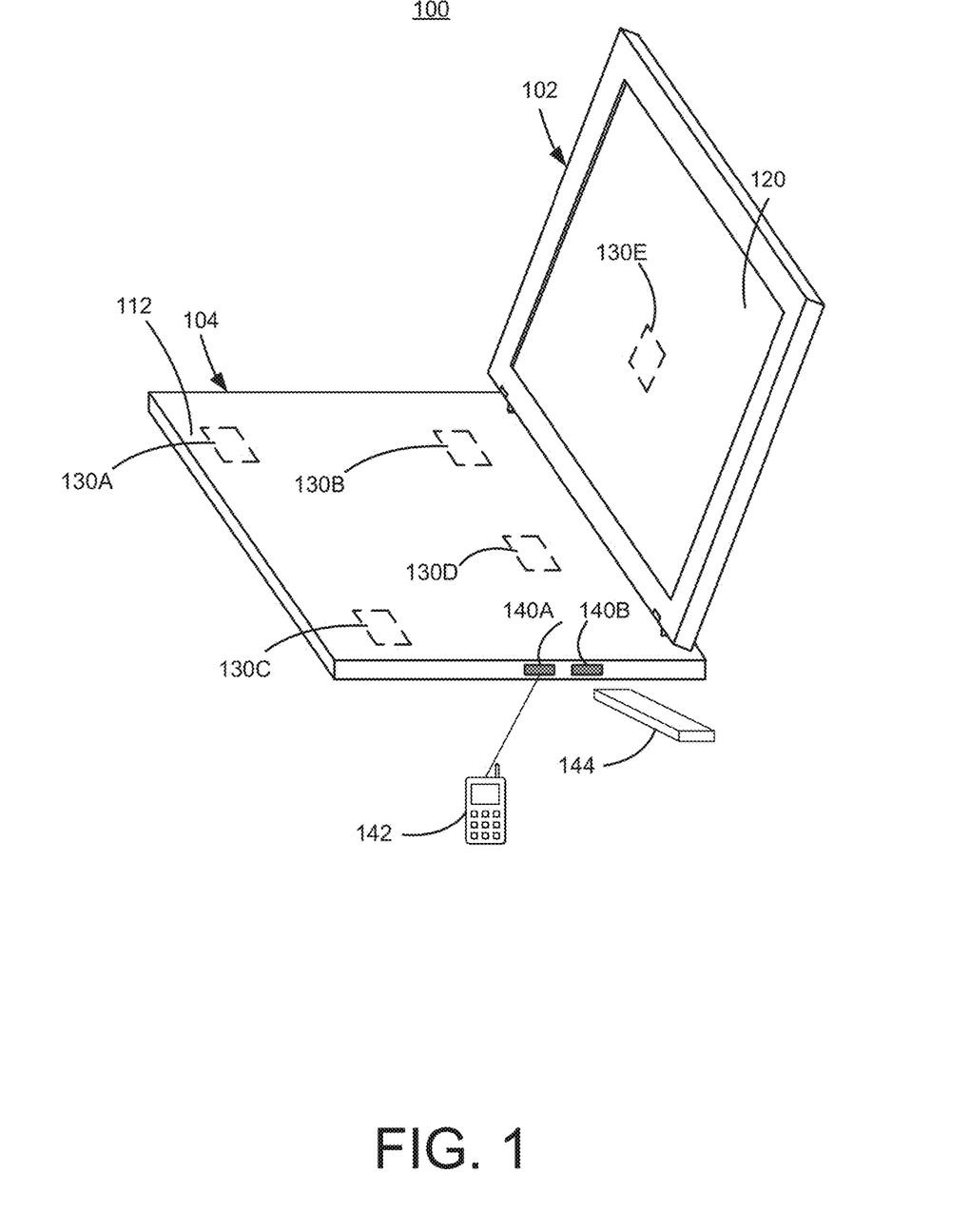
FIG. 1 is a block diagram of an example computer device including distributed sensors, according to an implementation described here.

FIG. 1 is a block diagram of an example computer device including distributed sensors, according to an implementation described here. Computer system 100 includes a display portion 102 and a base portion 104. Display portion 102 may include a display 120 that can be, for example, a liquid crystal display (LCD), a light emitting diode (LED) display, or other type of electronic visual display device. The base portion 104 can include, among other components, a trackpad (not shown), a housing 112, and a keyboard portion (not shown). The base portion 104 can also include one or more Universal Serial Bus (USB) ports (such as USB ports 140A, 140B) or other external ports that may be used by external devices to connect to computer system 100. As examples, a smartphone 142 may connect (e.g., via a cable) to USB port 140A, and flash drive 144 may connect to USB port 140B. Other examples of devices that may connect to computer system 100 include hard drives, printers, digital cameras, scanners, mice, joysticks, webcams, speakers, telephones, video phones, storage devices, network connections, 3G modems, or Wi-Fi devices.

The computer system 100 can include one or more thermal sensors distributed across the computer device. The sensors may be positioned within various locations of computer system 100. In FIG. 1, the sensors are represented by dashed lines to illustrate sensors 130A, 130B, 130C, 130D, and 130E. The sensors may sense on or more temperatures of a zone of the computer system 100. The sensors may continually monitor, detect, and update sensor temperature data while a computer system 100 is powered on (e.g., in an active mode, sleep mode, etc.). For example, two types of sensor temperature data may be available: "local" (or on die) and "remote" (or skin) temperature. The local temperature may represent the temperature of the sensor die itself and is a closer representation of a motherboard (or PCB) temperature. The remote temperature may be based on an absorption of infrared rays emitted by a heated object and is used for measuring the case (or skin) temperature of computer system 100. A predetermined value can be different for local and remote temperatures for the same sensor. For example, a local threshold value for a sensor temperature can be set to 50 C, and a remote threshold value for the same sensor can be set to 35 C. A thermal detection system, described in more detail below, may take both types of sensor temperature data into account. Sensors may be positioned within display portion 102 and/or base portion 104. It will be appreciated that any number of sensors may be used without departing from the scope of the techniques described here.

Figure 2:
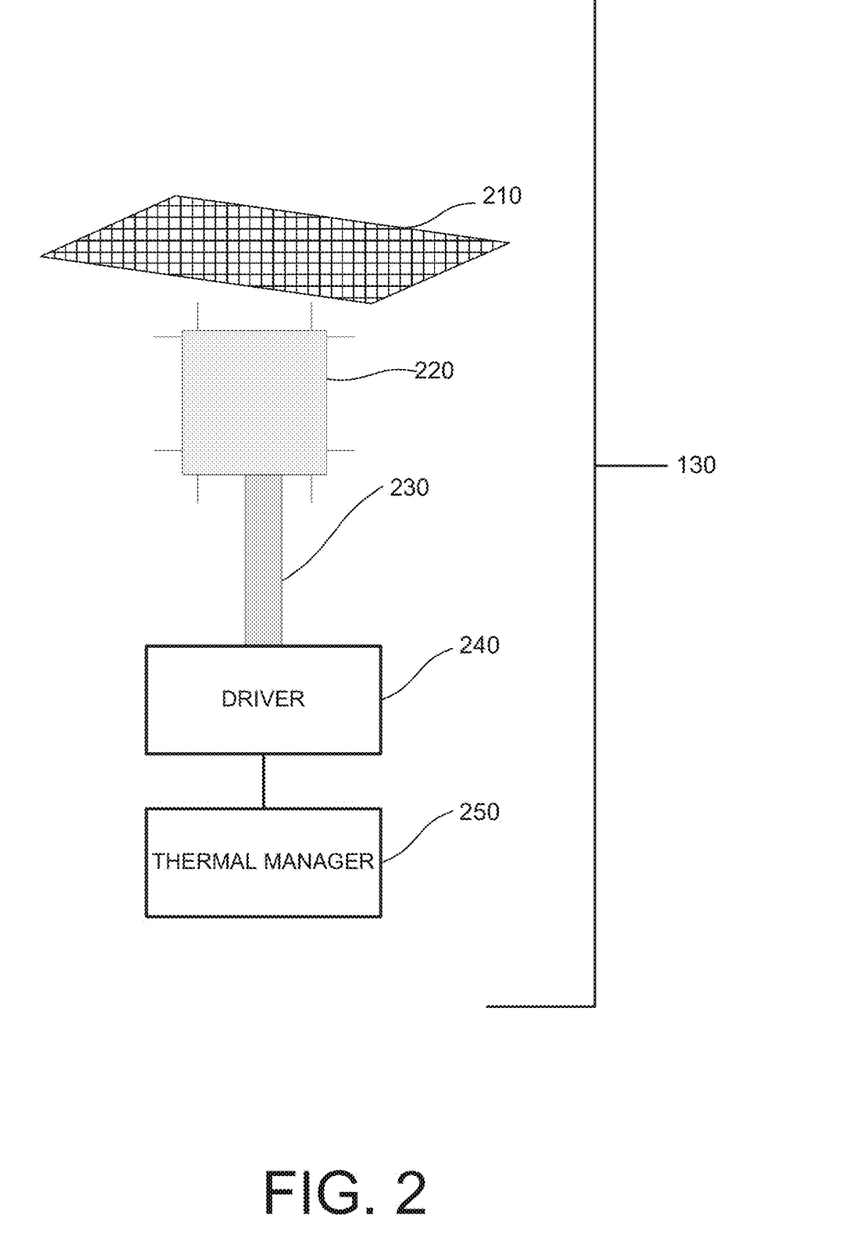
FIG. 2 is a block diagram of an example sensor and related components.

FIG. 2 is a block diagram of an example sensor and related components. Sensor 130 includes sensing area 210, controller 220, bus 230, driver 240, and thermal manager 250. Sensing area 210 can include a thermal digital sensor, for example, configured to detect a temperature within a given zone of computer system 100. Controller 220 may be operably coupled to sensing area 210. Controller 220 may be an embedded microcontroller chip and may include, for example, read-only firmware. Controller 220 may include a single integrated circuit containing a processor core, memory, and programmable input/output peripherals. Bus 230 may be a PS/2, I2C, SPI, WSB, or other bus. Bus 230 may be operably coupled to controller 220 and may communicate with driver 240. Driver 240 may include firmware and may also include and/or communicate with thermal manager 250. Thermal manager 250 may include executable code, data types, functions, and other files (such as JAVASCRIPT files) which may be used to process input to sensor 130 (such as remote and local temperatures). Thermal manager 250, in combination with driver 240, bus 230, controller 220, and sensing area 210, may be used to implement various processes, such as the processes described in more detail below with respect to FIGS. 3 and 4, for example.

Thermal manager 250 may receive data from one or more sensors and may therefore have access to power consumption levels for any and all devices of the computer system (e.g., CPU, GPU, display screen, battery, USB device, etc.) Thermal manager 250 may also, in certain implementations, control any active and/or passive cooling of the computer system. As described in more detail below with respect to FIGS. 3 and 4, consolidating such data and cooling control in a central location, i.e., thermal manager 250, provides an improved balance between system performance, heat, and noise and provides a centralized point of control for cooling a computer system.

Thermal manager 250 may implement various cooling processes for each device. As an example, a fan has several revolutions per minute (RPM) at which it can run, and a CPU or GPU may have several frequencies at which it can run, and similar options may apply to other devices. These options allows the thermal manager 250 various opportunities for cooling the computer system 100 shown in FIG. 1. In some implementations, the thermal manager 250 can continue cranking up cooling capability (e.g., for one or more devices) as long as a detected temperature (e.g., for one or more sensors) exceeds a given threshold. For example, the thermal manager 250 may start a fan at 3K RPM, then increase the fan speed up to 5K, 7K etc., as long as the temperature does not fall below the threshold. In some implementations, each sensor (or device) may have multiple different temperature thresholds at which the thermal manager 250 may implement different actions. For example, if a detected temperature for a sensor (which may be associated with a particular device, for example based on the proximity of the device to the sensor) exceeds 35 C, the thermal manager 250 may set a fan to 3K RPM; if the detected temperature exceeds 40 C, the thermal manager 250 may set the fan to 5K RPM; if the detected temperature exceeds 45 C, the thermal manager 250 may set the fan to 7K RPM, etc.

Figure 3:
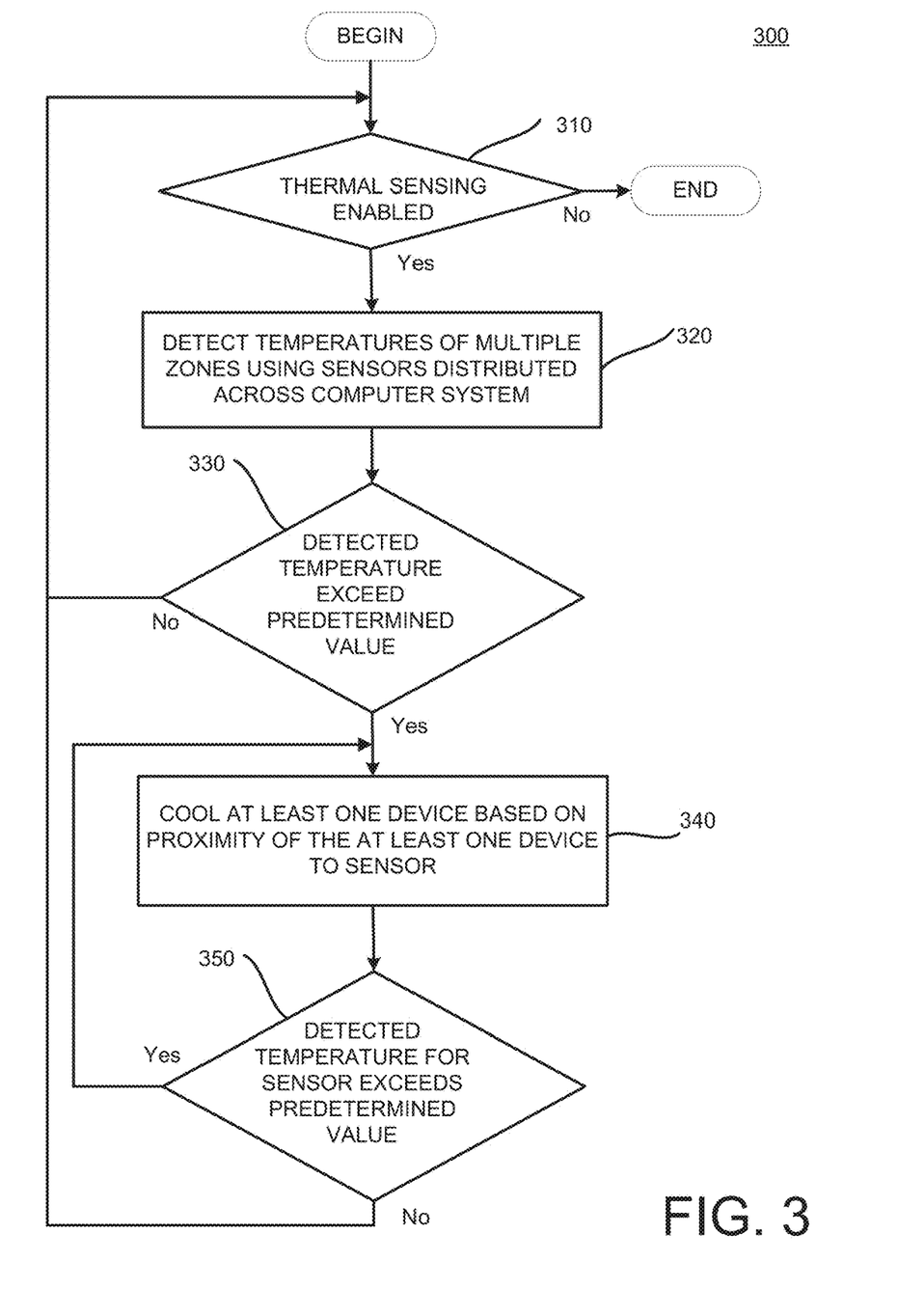
FIG. 3 is a flow diagram of an example process that may be used for thermal adjustment of a computer system, according to an implementation described here.

FIG. 3 is a flow diagram of an example process that may be used for thermal adjustment of a computer system, according to an implementation described here. The process 300 may be executed, for example, by a microcontroller of a computer device (such as the controller shown in FIG. 2) and/or may be implemented as part of a thermal manager shown in FIG. 2. The process 300 may be applied for each received input frame of data. The process 300 includes determining if thermal sensing is enabled (310). For example, if computer system 100 is powered on, then thermal sensing may be enabled (310, yes). If computer system 100 is in a "sleep" mode or is in the process of shutting down, for example, then thermal sensing may not be enabled (310, no).

Process 300 includes detecting temperatures of multiple zones of a computer system using sensors distributed across the computer system (320). The sensors may be, for example, the thermal sensors described above with respect to FIG. 1. The process determines whether the detected temperature exceeds a predetermined value (330). For example, in various implementations, none of the zone temperatures may exceed an upper bound (e.g., 55 C skin temperature), for example for safety reasons. The predetermined value may be set to this upper bound by default, or by a user of computer system 100. In certain implementations, each sensor may have a different upper (or lower) bound (i.e., predetermined value), which may be adjusted by a user or configured by default based on the location of the sensor in the computer system. For example, a sensor located near a display area of a computer system may have a different upper/lower bound temperature than a sensor located near a CPU or GPU. Further, each predetermined value may take into account both local and remote temperatures detected by each sensor (e.g., by adding, averaging, or otherwise utilizing parameter for both local and remote temperatures detected by the sensor).

In some implementations, one or more thresholds (e.g., predetermined values) may also change based on time of day. For example, fans may seem louder at night because the surroundings are quieter and therefore may have higher temperature thresholds at night. In some implementations, one or more thresholds may also change based on configuration settings such as whether a laptop is in a docking station, whether the laptop is being powered by AC or battery, or other configuration settings. For example, a computer device may lower a temperature threshold when the computer device is being powered by battery.

If the detected temperature for the sensor exceeds the predetermined value (330, yes), then the computer system may cool at least one device (e.g., CPU, GPU, backlight of display 120, etc.) based on a proximity of the at least one device to the sensor (340). Thus, the computer system may determine a proximity of the at least one device to the sensor. For example, turning back to FIG. 1, if the sensor temperature (e.g., accounting for one or more of a remote temperature and a local temperature) of sensor 130E exceeds 55° C., computer system 100 may dim a backlight of display 120 because the computer system 100 may determine that the display 120 is within a predetermined proximity (e.g., distance) to sensor 130E. Such cooling (e.g., dimming) may be performed at least until the detected temperature for the sensor no longer exceeds the predetermined value, for example. In such an example, the computer system may have detected a high temperature at sensor 130E, but not at any other sensors. The computer system determined that the backlight, which is in proximity to sensor 130E, needed cooling. The computer system therefore only activated cooling for the backlight of display 120 rather than activating a fan which would only cool a CPU.

Other examples of cooling include activating a fan to cool a zone of the computer system where the sensor is located. Other examples of cooling include slowing down a battery charging speed, changing a speed of a CPU or GPU of the computer system, or disabling a remote device connected to the computer system, such as disabling the charging of a smartphone connected to a USB port (e.g., smartphone 142 shown in FIG. 1).

Thermal manager 250 can store different threshold temperatures for different devices, zones, and/or distances of devices from each of the sensors. Such information may be stored in, for example, a lookup table that can be accessed by the thermal manager 250, for example, to handle temperature control.

The process 300 may continue cooling at least one device (e.g., dimming a backlight, slowing down a CPU/GPU or battery charging, disabling the charging of a smartphone connected to a USB port) until the detected temperature for the sensor no longer exceeds the predetermined value (350, no). Otherwise the process continues to cool the at least one device (350, yes).

If the detected temperature for the sensor does not exceed the predetermined value (340, no), then the process 300 continues to detect and analyze temperatures if thermal sensing is enabled. Thus, process 300 may continue as long as at least one sensor in computer system 100 is reporting a temperature higher than a given target temperature. In additional or alternative implementations, process 300 may operate (e.g., in the opposite direction) as long as the reported system temperature is below a (possibly different) temperature threshold.

The process 300 is an example only, and may have steps added, deleted, reordered, or modified. For example, step 310 may be deleted. Some or all of the process 300 may be independently and simultaneously run for each of the sensors depicted in FIG. 1.

Figure 4:
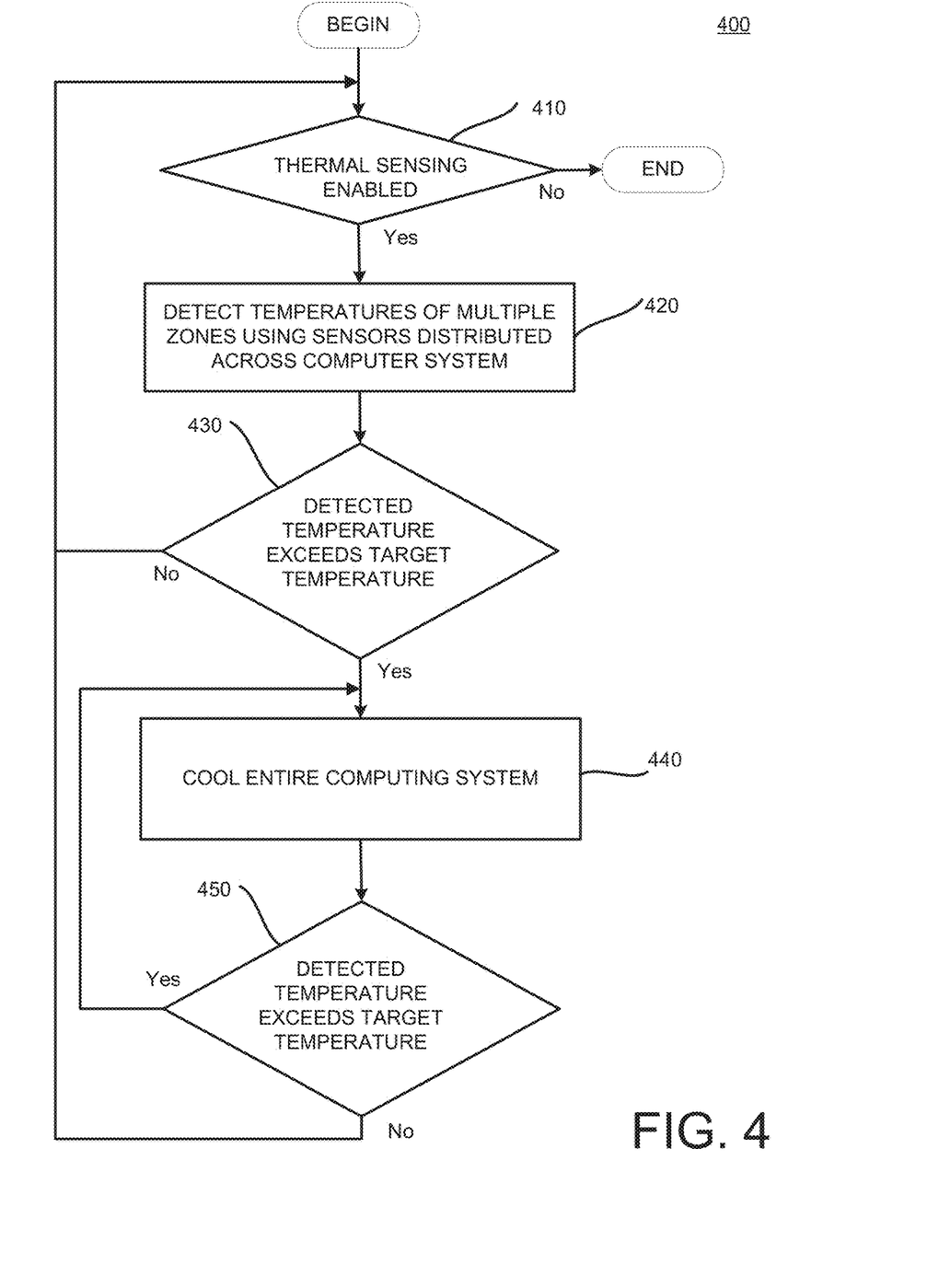
FIG. 4 is a flow diagram of an example process that may be used for thermal adjustment of a computer system, according to an implementation described here.

FIG. 4 is a flow diagram of an example process that may be used for thermal adjustment of a computer system, according to an implementation described here. The process 400 may be executed, for example, by a microcontroller of a computer device (such as the controller shown in FIG. 2) and/or may be implemented as part of a thermal manager shown in FIG. 2. The process 400 is an example only, and may have steps added, deleted, reordered, or modified. The process 400 may be applied for each received input frame of data. Process 400 includes determining if thermal sensing is enabled (410). For example, if computer system 100 is powered on, then thermal sensing may be enabled (410, yes).

The process 400 includes detecting temperatures of multiple zones of a computer system using sensors distributed across the computer system (420). The sensors may be, for example, the thermal sensors described above with respect to FIG. 1. The process determines whether the detected temperature exceeds a target temperature (430). For example, in various implementations, the overall computer system's temperature may not exceed an upper bound (e.g., 55 C skin temperature). The target temperature may be set to this upper bound by default, or by a user of the computer system, as examples. The computer system may determine if the detected temperature exceeds a target temperature by summing, averaging, or otherwise accounting for the temperatures detected by each sensor (e.g., local and/or remote temperatures). The detected temperature may be determined based on a subset of the sensors (e.g., an average of temperatures for sensor 130A and 130B).

If the detected temperature (e.g., an average system temperature) for the sensors exceeds the target temperature (430, yes), then the computer system may cool the entire computer system (e.g., all of the devices, including the CPU, the GPU, a backlight of display, a remote device, etc.) (440). For example, the computer system may activate any passive cooling (e.g., slowing down any active devices such as the CPU, a GPU, any battery charging, or dimming a backlight of a display), and may also activate any active cooling (e.g., a fan) if active cooling devices exist in the computer system. It will be appreciated that some computer systems do not include any active cooling devices (e.g., fans). In some implementations, the computer system may determine which devices are active at the time the target temperature is exceeded, and may activate cooling for only those devices (e.g., slowing down a CPU and a GPU because they are operating, but not slowing down any battery charging because no battery is charging at the time the target temperature is exceeded).

The process 400 may continue cooling the computer system until the detected temperature for the sensors no longer exceeds the target temperature (450, no). Otherwise the process continues to cool the computer system (450, yes).

If the detected temperature for the sensors do not exceed the target temperature (450, no), then the process 400 continues to detect and analyze temperatures if thermal sensing is enabled. Thus, process 400 may continue as long as at least one sensor in a computer system is reporting a temperature higher than a given target temperature. In additional or alternative implementations, process 400 may operate (e.g., in the opposite direction) as long as the reported system temperature is below a (possibly different) temperature threshold.

The process 400 is an example only, and may have steps added, deleted, reordered, or modified. For example, step 410 may be deleted.

Figure 5:
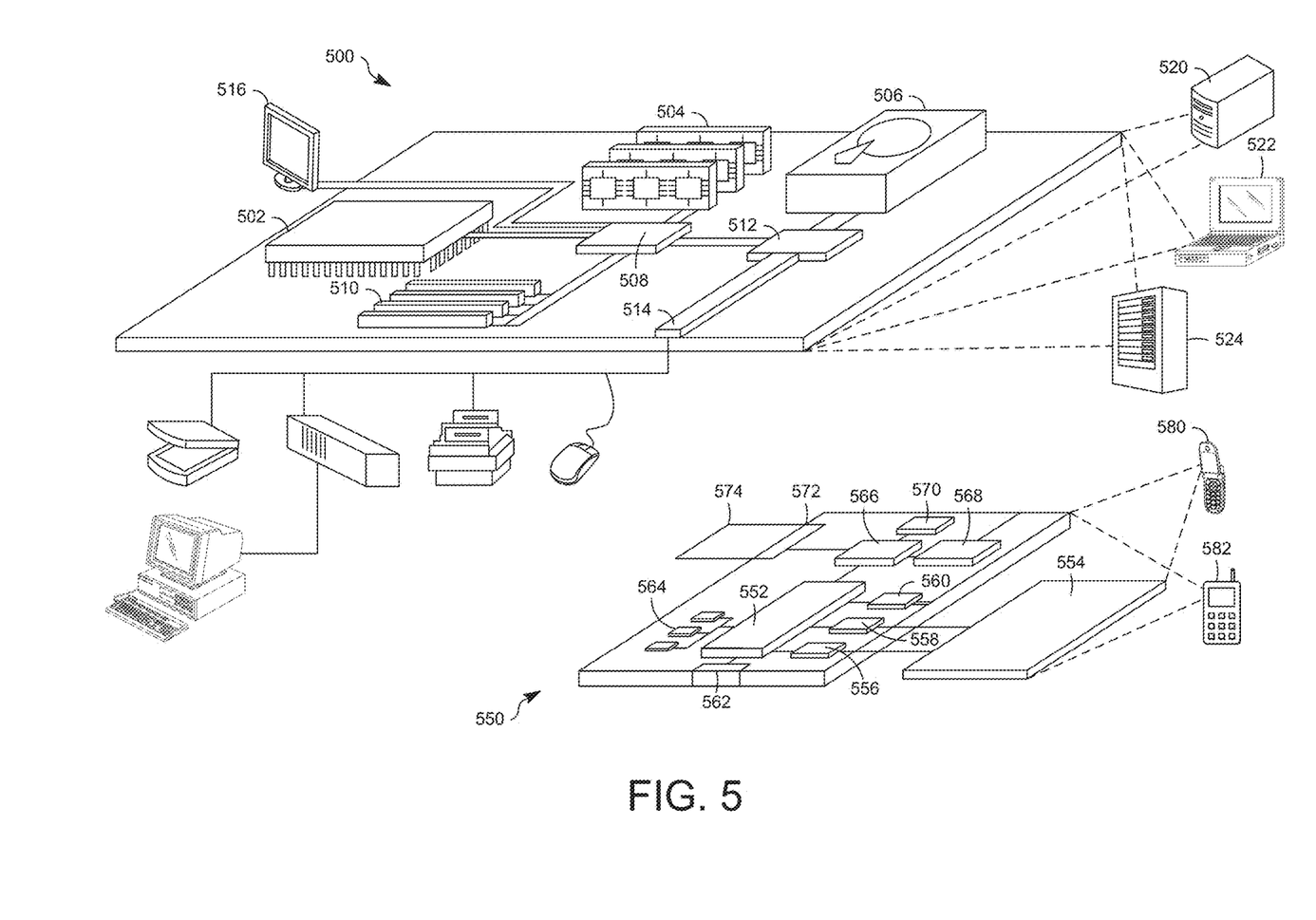
FIG. 5 shows an example of a computer device and a mobile computer device that can be used to implement the techniques described here.

FIG. 5 is a block diagram showing example or representative computing devices and associated elements that may be used to implement systems and methods described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, BLUETOOTH, ETHERNET, wireless ETHERNET) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a BLUETOOTH, WIFI, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.), may include background sounds such as irregular key clicks or mouse clicks, and may also include sound generated by applications operating on device 550. Audio codec 560 may also include a digital signal processor. Device 550 may also communicate using a video codec or other codec chip (not shown).

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and mechanisms or features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

What is claimed is:

1. A method, comprising:
   detecting, by a plurality of sensors distributed within a housing of a computing device, temperatures of a plurality of zones defined within the housing of the computing device, each sensor of the plurality of sensors being respectively associated with at least one zone of the plurality of zones and with at least one component, of a plurality of components of the computing device, associated with the at least one zone, and each sensor of the plurality of sensors detecting a local temperature corresponding to a location of the sensor within the respective zone associated with the sensor and a remote temperature separated from the location of the sensor and within the respective zone associated with the sensor; and
   for each sensor of the plurality of sensors:
      detecting the local temperature associated with the sensor;
      comparing the detected local temperature to a predetermined local temperature value associated with the sensor;
      detecting a remote temperature associated with the sensor;
      comparing the detected remote temperature to a predetermined remote temperature value associated with the sensor, the predetermined remote temperature value being different from the predetermined local temperature value;
      if the detected local temperature exceeds the predetermined local temperature value, or if the detected remote temperature exceeds the predetermined remote temperature value, identifying a component of the plurality of components, the identified component being positioned within the respective zone associated with the sensor, the identification of the component being based on a proximity of each of the plurality of components to the sensor; and
      cooling the identified component in accordance with a cooling profile selected from a plurality of cooling profiles, including cooling the identified component in accordance with a first cooling profile when the detected local temperature exceeds the predetermined local temperature value, and cooling the identified component in accordance with a second cooling profile when the detected remote temperature exceeds the predetermined remote temperature value.

2. The method of claim 1, wherein cooling the identified component of the plurality of components in the respective zone includes at least one of:
   slowing down a battery charging speed;
   dimming a backlight of a display of the computing device;
   changing a speed of a central processing unit of the computing device;
   changing a speed of a graphics processing unit of the computing device; or
   disabling a remote device connected to the computing device.

3. The method of claim 1, wherein the computing device is a laptop.

4. The method of claim 1, wherein cooling the component of the plurality of components in the respective zone includes cooling the at least one component until the detected local temperature no longer exceeds the predetermined local temperature value, or until the remote temperature value no longer exceeds the predetermined remote temperature value.

5. The method of claim 1, wherein cooling the identified component of the plurality of components in the respective zone includes:
   activating a fan to cool the respective zone of the multiple zones where the sensor is located;
   rotating the fan at an initial rotational speed;
   detecting an intermediate temperature associated with the sensor;
   adjusting the rotation speed of the fan to one of a plurality of intermediate rotational speeds based on the detected intermediate temperature; and
   repeating the rotating, detecting and adjusting until the detected local temperature is less than or equal to the predetermined local temperature value, or until the detected remote temperature is less than or equal to the predetermined remote temperature value.

6. The method of claim 5, wherein adjusting the rotation speed of the fan to one of a plurality of intermediate rotational speeds based on the detected intermediate temperature includes:
   decreasing the rotation speed of the fan when a difference between a currently detected intermediate temperature and a previously detected intermediate temperature is greater than or equal to a predetermined value.

7. The method of claim 5, wherein adjusting the rotation speed of the fan to one of a plurality of intermediate rotational speeds based on the detected intermediate temperature includes:
   increasing the rotation speed of the fan when a difference between a currently detected intermediate temperature and a previously detected intermediate temperature is less than or equal to a predetermined value in a predetermined period of time.

8. The method of claim 5, wherein cooling the identified component of the plurality of components in the respective zone includes:

selecting the initial rotation speed of the fan based on a difference between the detected local temperature and the predetermined local temperature value, or based on a difference between the determined remote temperature and the predetermined remote temperature value.

9. The method of claim 5, wherein cooling the identified component of the plurality of components in the respective zone includes:
setting the predetermined local temperature value, or the predetermined remote temperature value, based on at least one environmental factor, the at least one environmental factor including at least one of a time of day or a power source providing power to the computing device.

10. A computer system, comprising:
a plurality of devices including a central processing unit and a graphics processing unit received in a housing;
at least one cooling device included in the housing;
a plurality of sensors distributed within the housing, each sensor of the plurality of sensors being configured to detect a respective remote temperature and a respective local temperature for a corresponding zone defined within the housing of the computer system and associated with the sensor;
a memory including executable code; and
a processor operably coupled to the memory and configured to execute the executable code to:
detect a plurality of temperatures of a plurality of zones using the plurality of sensors, each sensor of the plurality of sensors being associated with a respective zone of the plurality of zones and with at least one device, of the plurality of devices, associated with the respective zone; and
for each sensor of the plurality of sensors, to:
detect a local temperature at a first location corresponding to the sensor;
determine whether the detected local temperature associated with the sensor exceeds a predetermined local temperature value;
detect a remote temperature at a second location that is separated from the first location and within the respective zone associated with the sensor;
determine whether the detected remote temperature associated with the sensor exceeds a predetermined remote temperature value, the predetermined remote temperature value being different from the predetermined local temperature value; and
if the detected local temperature exceeds the predetermined local temperature value, or if the determined remote temperature exceeds the predetermined remote temperature value, to:
identify a device of the plurality of devices, the identified device being positioned within the zone associated with the sensor, the identification of the device being based on a proximity of each of the plurality of devices to the sensor, and
activate the at least one cooling device to cool the identified device of the plurality of devices within the zone associated with the sensor in accordance with a cooling profile selected from a plurality of cooling profiles, including cooling the identified device in accordance with a first cooling profile when the detected local temperature exceeds the predetermined local temperature value, and cooling the identified device in accordance with a second cooling profile when the detected remote temperature exceeds the predetermined remote temperature value.

11. The system of claim 10, wherein, in activating the at least one cooling device to cool the identified device of the plurality of devices within the zone associated with the sensor in accordance with a cooling profile selected from a plurality of cooling profiles, the processor is further configured to execute the executable code to:
rotate a fan at an initial rotational speed;
detect an intermediate local temperature, or an intermediate remote temperature, associated with the sensor;
adjust the rotation speed of the fan to one of a plurality of intermediate rotational speeds based on the detected intermediate local temperature or the detected intermediate remote temperature; and
repeat the rotation, detection and adjustment until the detected local temperature is less than or equal to the predetermined local temperature value, or until the detected remote temperature is less than or equal to the predetermined remote temperature value.

* * * * *